United States Patent
Bjernetun et al.

(10) Patent No.: US 8,571,772 B2
(45) Date of Patent: Oct. 29, 2013

(54) METHOD AND DEVICE FOR SECURING LUBRICATION OF AN AUTOMATED MANUAL TRANSMISSION IN A VEHICLE

(75) Inventors: Johan Bjernetun, Göteborg (SE); Anders Eriksson, Torslanda (SE); Johnny Yngve, High Point, NC (US)

(73) Assignee: Volvo Lastvagnar AB, Göteborg (SE)

( * ) Notice: Subject to any disclaimer, the term of this patent is extended or adjusted under 35 U.S.C. 154(b) by 466 days.

(21) Appl. No.: 12/991,429

(22) PCT Filed: May 9, 2008

(86) PCT No.: PCT/SE2008/000321
§ 371 (c)(1),
(2), (4) Date: Nov. 15, 2010

(87) PCT Pub. No.: WO2009/136818
PCT Pub. Date: Nov. 12, 2009

(65) Prior Publication Data
US 2011/0066340 A1 Mar. 17, 2011

(51) Int. Cl.
*G06F 7/00* (2006.01)
*G06F 17/00* (2006.01)

(52) U.S. Cl.
USPC ............. 701/60; 701/58; 475/20; 475/159; 192/85.61; 192/113.35

(58) Field of Classification Search
USPC ............. 701/53, 55–56, 60, 58; 74/457–468, 74/640; 475/269, 331–3, 84, 88, 20, 159; 180/247; 192/113.35, 85.61; 700/28–55
See application file for complete search history.

(56) References Cited

U.S. PATENT DOCUMENTS 3,533,307 A * 10/1970 Gunderson ................. 475/131
4,777,837 A   10/1988 Lehle
(Continued)

FOREIGN PATENT DOCUMENTS

DE    10014731 C1    7/2001
EP     1111274 A2    6/2001
(Continued)

OTHER PUBLICATIONS

Lubrication level diagnostics using vibration analysis; Banks, Jeffrey C.; Reichard, Karl M.; Brought, Mark S. Aerospace Conference, 2004. Proceedings. 2004 IEEE; vol. 6; Digital Object Id 10.1109/AERO.2004.1368169; Publication Year: 2004, pp. 3528-3534 vol. 6.*

(Continued)

*Primary Examiner* — Cuong H Nguyen
(74) *Attorney, Agent, or Firm* — WRB-IP LLP

(57) ABSTRACT

A method and device are provided for securing lubrication of an automated manual transmission, AMT, in a vehicle, when towing the vehicle, and where a transmission lubrication system is drivingly connected to and driven by rotation of an intermediate shaft of the AMT. The following steps can be executed in mentioned order and starting from when ignition of the vehicle is switched on: registering a signal that towing of the vehicle is demanded, disengaging all gears that are arranged to drivingly engage or disengage an input shaft to the intermediate shaft of the automated manual transmission, and engaging one gear that is arranged to drivingly engage or disengage the intermediate shaft to an output shaft of the automated manual transmission.

10 Claims, 3 Drawing Sheets

(56) References Cited

U.S. PATENT DOCUMENTS

| | | | |
|---|---|---|---|
| 5,557,980 A | | 9/1996 | Mastroianni et al. |
| 5,704,863 A | * | 1/1998 | Zalewski et al. ............... 475/88 |
| 6,059,682 A | * | 5/2000 | Friedmann et al. ........... 475/159 |
| 6,702,711 B2 | * | 3/2004 | Zelikov et al. ................ 475/331 |
| 7,025,704 B2 | * | 4/2006 | Yasuda et al. ................. 475/323 |
| 7,377,874 B2 | * | 5/2008 | Hayabuchi et al. ........... 475/289 |
| 8,359,144 B2 | * | 1/2013 | Morris et al. ................... 701/51 |
| 2004/0147361 A1 | * | 7/2004 | Yasuda et al. ................. 475/331 |
| 2005/0204841 A1 | | 9/2005 | Baldwin et al. |
| 2006/0122025 A1 | * | 6/2006 | Hayabuchi et al. ........... 475/269 |
| 2011/0066340 A1 | * | 3/2011 | Bjernetun et al. .............. 701/60 |

FOREIGN PATENT DOCUMENTS

| | | |
|---|---|---|
| WO | 0192049 A1 | 12/2001 |
| WO | 2004092618 A1 | 10/2004 |

OTHER PUBLICATIONS

The influence of parallel hybrid vehicle on synchronizer performance; Xiangyan Xin ; Zaimin Zhong; Mechatronic Science, Electric Engineering and Computer (MEC), 2011 International Conf. on; Digital Object Id: 10.1109/MEC.2011.6025566 Publication Year: 2011 , pp. 721-724.*

Electromagnetic performances analysis of a new magnetic-planetary-geared permanent magnet brushless machine for hybrid electric vehicles; Zhu, Xiaoyong et al.; IECON 2012—38th Annual Conf. on IEEE Industrial Electronics Society Digital Object Id. 10.1109/IECON.2012.6389232; Pub Yr: 2012 , pp. 4110-4114.*

Assessment of advanced thermal management systems for micro-hybrid trucks and heavy duty diesel vehicles; Staunton, N. ; Pickert, Volker ; Maughan, R.; Vehicle Power and Propulsion Conference, 2008. VPPC '08. IEEE; Digital Object Identifier: 10.1109/VPPC.2008.4677464; Publication Year: 2008 , pp. 1-6.*

Design and Analysis of a Transmission Hydraulic System for an Engine-Flywheel Hybrid-Vehicle; Karmel, A.M. American Control Conference, 1988; Publication Year: 1988 , pp. 2385-2391.*

Supplementary European Search Report for corresponding European App, EP 08 75 3942.

International Search Report corresponding International App. PCT/SE2008/000321.

* cited by examiner

METHOD AND DEVICE FOR SECURING LUBRICATION OF AN AUTOMATED MANUAL TRANSMISSION IN A VEHICLE

BACKGROUND AND SUMMARY

The present invention relates to a method for towing a vehicle equipped with an automatic manual transmission (AMT). In particular, an aspect of the invention will find its application in connection with automotive vehicles with an AMT where a lubricating system arranged in the AMT for lubricating said AMT is driven by a propulsion unit of the vehicle during idle drive.

An aspect of the invention also relates to a device intended for such a method for towing a vehicle equipped with an AMT.

An aspect of the present invention also relates to a computer program and computer program product both to be used with a computer for executing said method.

Automated manual transmissions (AMT) have become increasingly common in heavy-duty vehicles as microcomputer technology has developed further and made it possible, with a control computer and a number of actuators, for example servo motors, to precision-regulate engine speed, engagement and disengagement of an automated disk clutch between the engine and the gearbox and also the coupling means of the gearbox in relation to one another, so that soft shifting is always obtained at the correct engine speed. In heavy-duty vehicles, these automatic gearboxes are often equipped with a basic gearbox, which has forward and reverse gears, and also auxiliary gears, which auxiliary gears can be arranged in series before and/or after the basic gearbox. An example of an auxiliary gear arranged serially before the basic gearbox is a split gear and of an auxiliary gear arranged serially after the basic gearbox is a range gear (see, for example, WO0192049).

In order to introduce power shifting possibilities in an AMT the dual clutch transmissions (DCT) have been developed. This is basically an AMT with dual input shafts and corresponding clutches. A known example of a DCT is shown in US2005/0204841 and U.S. Pat. No. 4,777,837.

Common for both of the above mentioned types of transmissions is that there is often used a so-called forced-feed lubricating oil system in order to increase the service life of transmissions, when for example used in heavy trucks and buses. Such a forced-feed lubricating oil system usually comprises an oil pump which among other things supplies bearings in the transmission with an oil flow for lubrication and cooling. The oil pump may be located in various ways but usually it is driven directly or indirectly by an intermediate shaft in the transmission. The intermediate shaft is drivingly connected to a vehicle propulsion unit through an input shaft of the transmission. Driven wheels of the vehicle are drivingly connected to the intermediate shaft through an output shaft of the transmission. The input shaft, the intermediate shaft and the output shaft can have several different gears arranged to drivingly engage or disengage said input shaft to said intermediate shaft, and to drivingly engage or disengage said intermediate shaft to said output shaft. The engagement and disengagement of the different gears is controlled by a control unit.

When the vehicle is driven, the propulsion unit drives the forced-feed lubricating oil system by rotation of the intermediate shaft. During idle drive, that is when the vehicle is stopped and the propulsion unit is running, all gears between the intermediate shaft and the output shaft are disengaged and a gear between the input shaft and the intermediate shaft is engaged in order to drive the forced-feed lubricating oil system and secure lubrication during idle drive of the vehicle.

If the vehicle has to be towed away with the propulsion unit stopped the forced-feed lubricating oil system will not he driven and there is a risk of severe transmission damage since gears and bearings in the transmission are running without lubrication during towing. A known solution is to disconnect the driven wheels from the output shaft by demounting a propeller shaft of the vehicle.

A technical problem is to provide an alternative and improved solution to not risk damaging an AMT during towing of the vehicle.

It is desirable to provide an improved method and device for securing lubrication of an AMT in a vehicle during towing.

The method according to an aspect of the invention is a method for securing lubrication of an automated manual transmission in a vehicle, when towing said vehicle, and where a transmission lubrication system is drivingly connected to and driven by rotation of an intermediate shaft of said automated manual transmission. Said method is characterized by the following steps executed in mentioned order:

registering a signal that towing of the vehicle is demanded,
disengaging all gears that are arranged to drivingly engage or disengage an input shaft to said intermediate shaft of said automated manual transmission, and engaging one gear that is arranged to drivingly engage or disengage said intermediate shaft to an output shaft of said automated manual transmission.

According to one embodiment of the method according to an aspect of the invention said signal is manually initiated.

According to another embodiment of the method according to an aspect of the invention, said signal is automatically initiated when a vehicle fault is registered that will make towing of the vehicle necessary.

According to a further embodiment of the method according to an aspect of the invention, said signal is automatically initiated when vehicle velocity other than zero is registered and that a propulsion unit of said vehicle is turned off.

The device according to the an aspect of invention is an AMT in a vehicle comprising an input shaft, an intermediate shaft and an output shaft with several different gears arranged to drivingly engage or disengage said input shaft to said intermediate shaft, and to drivingly engage or disengage said intermediate shaft to said output shaft, and where a transmission lubrication system is drivingly connected to and driven by rotation of said intermediate shaft. The device is characterized in that a control unit is arranged to disengage all said gears drivingly connecting said input shaft and said intermediate shaft and to engage one of said gears arranged to drivingly connect said intermediate shaft and said output shaft, upon registration of a signal that towing of the vehicle is demanded and in order to drivingly connect said lubrication system with driven wheels of the vehicle.

According to one embodiment of the device according to the an aspect of invention said signal is initiated through a control for manually initiating said signal.

According to another embodiment of the device according to an aspect of the invention said AMT further comprises an auxiliary gearing connected in series to said output shaft and where an auxiliary gearing output shaft is further connected to said driven wheels. The auxiliary gear can for example be a range gear. Such a device is then further characterized in that said control unit is arranged to engage a gear of said auxiliary gear in order to drivingly connect said output shaft with said auxiliary gearing output shaft, upon registration of a signal that towing of the vehicle is demanded and in order to drivingly connect said lubrication system with driven wheels of the vehicle.

BRIEF DESCRIPTION OF THE DRAWINGS

The present invention will be described in greater detail below with reference to the accompanying drawing which, for the purpose of exemplification, shows further preferred embodiments of the invention and also the technical background, and in which.

DETAILED DESCRIPTION

Figure 1:
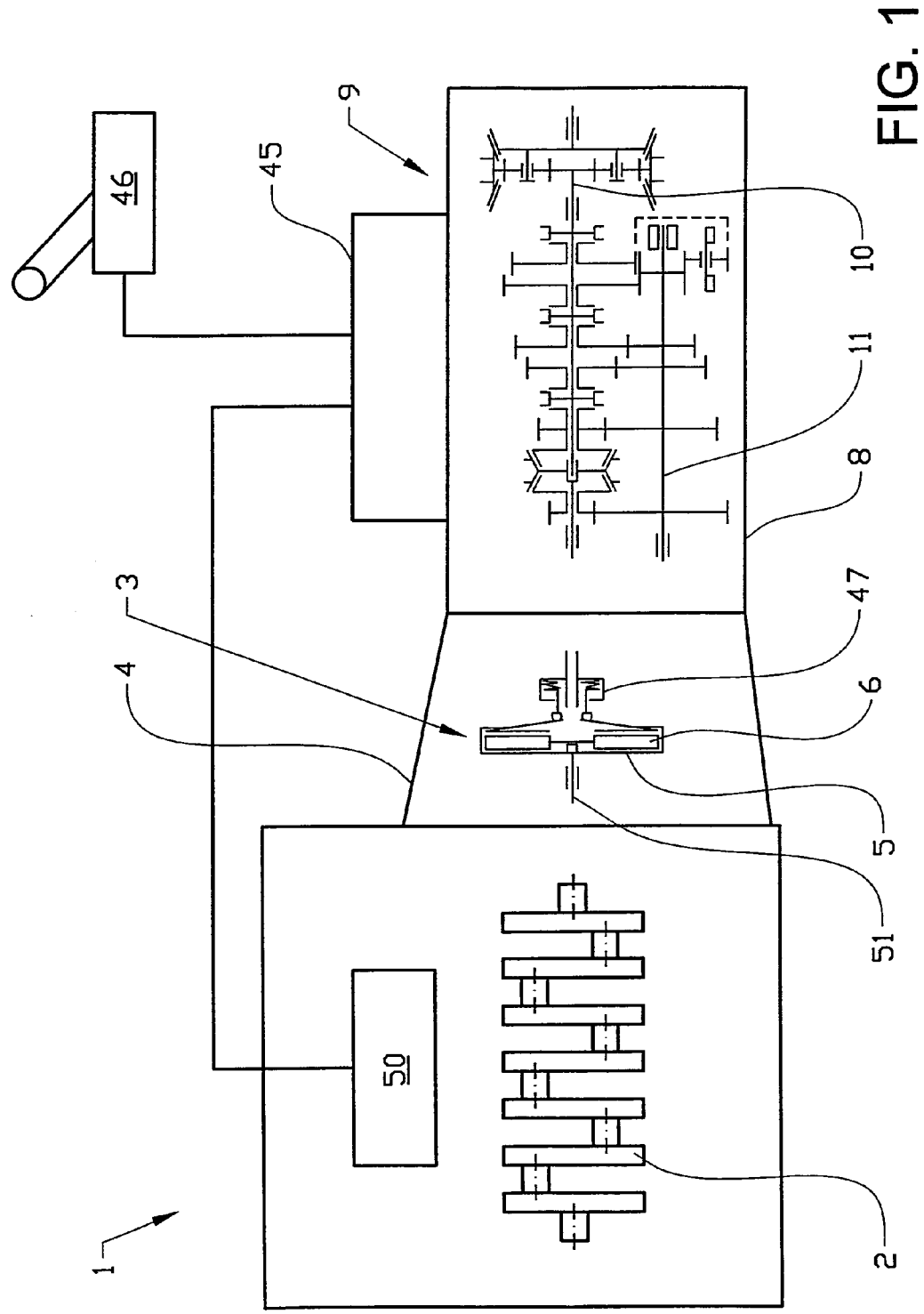
FIG. 1 shows a diagrammatic representation of an internal combustion engine with an AMT.

In FIG. 1, reference number 1 designates a propulsion unit, for example a diesel engine, the crankshaft 2 of which is coupled to a single-plate dry disk clutch, designated generally by reference number 3, which is enclosed in a clutch case 4. The crankshaft 2 is, via the output shaft 51 of the engine, connected non-rotatably to the clutch housing 5 of the clutch 3, while its plate 6 is connected non-rotatably to an input shaft 7 which is mounted rotatably in the casing 8 of an AMT designated generally by reference number 9. An output shaft 10 (main shaft) and an intermediate shaft 11 are also mounted rotatably in the casing 8.

Figure 2:
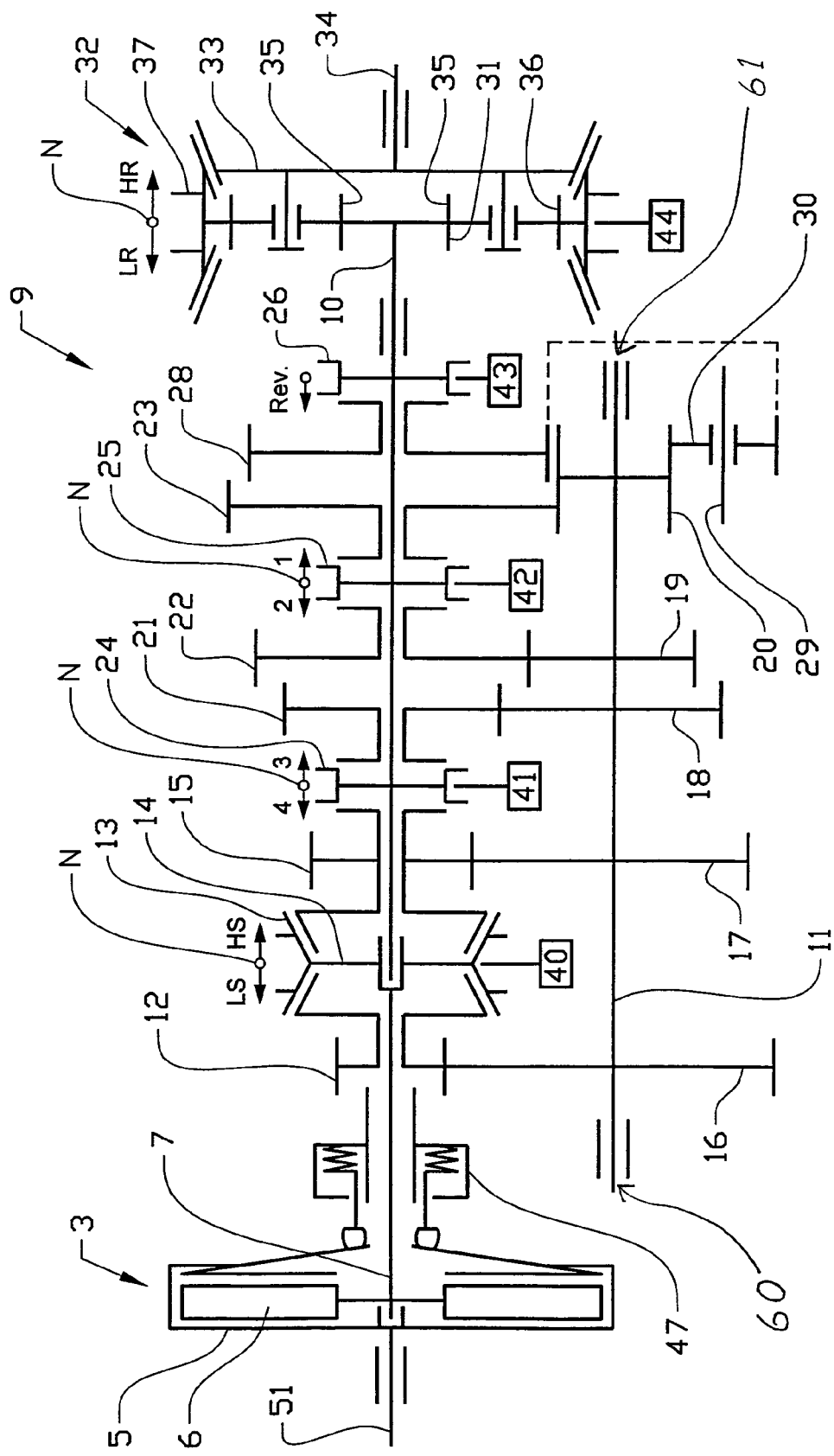
FIG. 2 shows the clutch and gearbox in the AMT in FIG. 1 on enlarged scale.

As can be seen most clearly from FIG. 2, a gearwheel 12 is mounted rotatably on the input shaft 7 and is lockable on the shaft by means of a coupling sleeve 13 which is provided with synchronizing means and is mounted non-rotatably but axially displaceable on a hub 14 connected non-rotatably to the input shaft 7. By means of the coupling sleeve 13, a gearwheel 15 mounted rotatably on the output shaft 10 is also lockable relative to the input shaft 7. With the coupling sleeve 13 in a central position, both the gearwheels 12 and 15 are disengaged from their shafts 7 and, respectively, 10. The gearwheels 12 and 15 engage with gearwheels 16 and, respectively, 17 which are connected non-rotatably to the intermediate shaft 11. Arranged in a rotationally fixed manner on the intermediate shaft 11 are further gearwheels 18, 19 and 20 which engage with gearwheels 21, 22 and, respectively, 23 which are mounted rotatably on the output shaft 10 and are lockable on the output shaft by means of coupling sleeves 24 and, respectively, 25 which, in the illustrative embodiment shown, do not have synchronizing devices. A further gearwheel 28 is mounted rotatably on the output shaft 10 and engages with an intermediate gearwheel 30 which is mounted rotatably on a separate shaft 29 and in turn engages with the intermediate shaft gearwheel 20. The gearwheel 28 is lockable on its shaft by means of a coupling sleeve 26.

The gearwheel pairs 12, 16 and 15, 17 and the coupling sleeve 13 form a synchronized split gear with a low gear stage LS and a high gear stage HS. The gearwheel pair 15, 17 also forms, together with the gearwheel pairs 21, 18, 22 19, 23, 20 and 28, 30, a basic gearbox with four forward gears and one reverse gear. Arranged in a rotationally fixed manner on the output end of the output shaft is a gearwheel 31 which, in the shown example, forms the sun●gear in a two-stage synchronized range gear of planetary type which is designated by reference number 32 and the planet-wheel carrier 33 of which is connected in a rotationally fixed manner to a shaft 34 which forms the range rear output shaft and the total output shaft of the gearbox. The planet wheels 35 of the range gear 32 engage with a ring gear 36 which, by means of a coupling sleeve 37, is lockable relative to the gearbox casing 8 for low range LR and relative to the planet-wheel carrier 33 for high range HR.

The coupling sleeves 13, 24, 25, 26 and 37 are displaceable as shown by the arrows in FIG. 2, the gear stages shown in conjunction with the arrows being obtained. The coupling sleeves 13, 24, 25 each have three positions, two gear positions and a neutral position N (central position). The coupling sleeve 26 has one gear position and a neutral position N. In an alternative embodiment (not shown) the coupling sleeve 37 has only two gear positions LR and HR. The displacement of the coupling sleeves is brought about by respective servo devices 40, 41, 42, 43 and 44 indicated diagrammatically in FIG. 2, which can be pneumatically operated piston/cylinder arrangements of the type used in an AMT of the type described above which is marketed under the name I-shift.

The servo devices 40, 41, 42, 43 and 44 are controlled by a control unit 45 (see FIG. 1), comprising a microcomputer, depending on signals fed into the control unit representing various engine and vehicle data, when an electronic gear selector 46 coupled to the control unit 45 is in its automatic shifting position. When the selector is in the position for manual shifting, shifting takes place at the command of the driver via the gear selector 46. In the shown example (FIG. 1) the control unit 45 of the AMT also communicates with a engine control unit 50 in a known way.

An oil pump in a transmission lubrication system (not shown) may be located and driven by the intermediate shaft in various ways. Three known and commonly encountered locations are described below:

1. The oil pump can be arranged at the front end of the intermediate shaft 11. In FIG. 2 arrow 60 points at the front end of the intermediate shaft 11, where the oil pump can he arranged.

2. The oil pump can also be arranged at the rear end of the intermediate shaft 11, that is to say on the right-hand side of the intermediate shaft 11 shown in FIG. 2. In FIG. 2 arrow 61 points at the rear end of the intermediate shaft 11, where the oil pump can be arranged alternatively.

3. The oil pump can also be arranged to be driven by a gear (not shown) arranged on a separate shaft (not shown), and which gear meshes with one of the gears on the intermediate shaft 11. It would also be possible to drive such an oil pump through one of the gear wheels 12, 15, 21, 22, 23 and 28 arranged on the input 7 or output shaft 10 since they always rotate with the intermediate shaft due to these gear wheels meshing with the corresponding gear wheels, which are fixed to the intermediate shaft 11.

The, in FIGS. 1 and 2, shown example disclose an AMT with an auxiliary gear in the form of a range gear 32. The following embodiments of aspects of the invention are applicable for an AMT equipped with or without a range gear. The following mentioned embodiments could also be used in an AMT without a split gear.

According to one embodiment of an aspect of the invention the control unit 45 can be programmed to execute the following steps in mentioned order:

registering a signal that towing of the vehicle is demanded, disengaging all gears (the split gears in the shown example)) that are arranged to drivingly engage or disengage the input shaft 7 to said intermediate shaft 11, and engaging one gear (basic gearbox gear) that is arranged to drivingly engage or disengage said intermediate shaft to an output shaft 10. In practice this means that said steps are executed when ignition of said vehicle is switched on. With this procedure it will be possible to tow the vehicle without risking damaging the transmission.

If the AMT is equipped with a range gear 32 as in FIGS. 1 and 2, said control unit 45 is then in one embodiment according to an aspect of the invention programmed, besides the steps mentioned above, to engage a gear of said range gear in order to drivingly connect said output shaft 10 with the range gear output shaft 34. Thus, this step is also performed upon registration of a signal that towing of the vehicle is demanded and in order to drivingly connect said lubrication system with driven wheels of the vehicle. The AMT-lubrication system also supplies the range gear with lubricant, and thus the inventive procedure also secures lubrication of the range gear during towing.

According to one embodiment of an aspect of the invention said signal is manually initiated. The manually initiated signal can be initiated through, for example, the driver pushing a button or a lever arranged on the dashboard. This embodiment has the advantage that the driver can secure lubrication of the transmission if there is no automatic initiation of said signal.

According to another embodiment of an aspect of the invention said signal is automatically initiated when a vehicle fault is registered that will make towing of the vehicle necessary. This means that ordinary faulty codes can be used for initiating the inventive procedure. Such a faulty code can normally be registered only during when the ignition of the vehicle is turned on, meaning that the sensors and control units of the vehicle has power supply. Thus, the control unit 45 can be programmed to initiate said signal when said control unit or another control unit has registered said type of vehicle fault.

According to another embodiment of an aspect of the invention said signal is automatically initiated when a velocity of the vehicle other than zero is registered and that the propulsion unit 1 of said vehicle is turned off. Thus, the control unit 45 can be programmed to initiate said signal when said control unit 45 or another control unit has registered a vehicle velocity other than zero and that said propulsion unit 1 is turned off.

Thus, if the driver for some reason does not notice that towing of the vehicle could damage the transmission due to no lubrication, the above mentioned automatic embodiments for securing such a lubrication will help the driver and save the transmission.

According to one embodiment of an aspect of the invention said different embodiments for securing lubrication of an AMT during towing of the vehicle can be applied in a vehicle equipped with an DCT (Dual Clutch Transmission) where a lubrication system of such a DCT is driven by a intermediate shaft in a corresponding way as described above.

According to one embodiment of an aspect of the invention said different embodiments for securing lubrication of an AMT during towing of the vehicle can be applied in a hybrid electric vehicle (HEV) equipped with a DCT or an AMT, having a lubrication system of the type described above.

When the vehicle has been towed, the function according to an aspect of the invention has been activated and the ignition of said vehicle has been switched off, the control unit can be programmed to after concluded towing and the ignition switched on again to selected neutral as usual, that is by disengaging all gears connecting the intermediate shaft to the output shaft.

Figure 3:
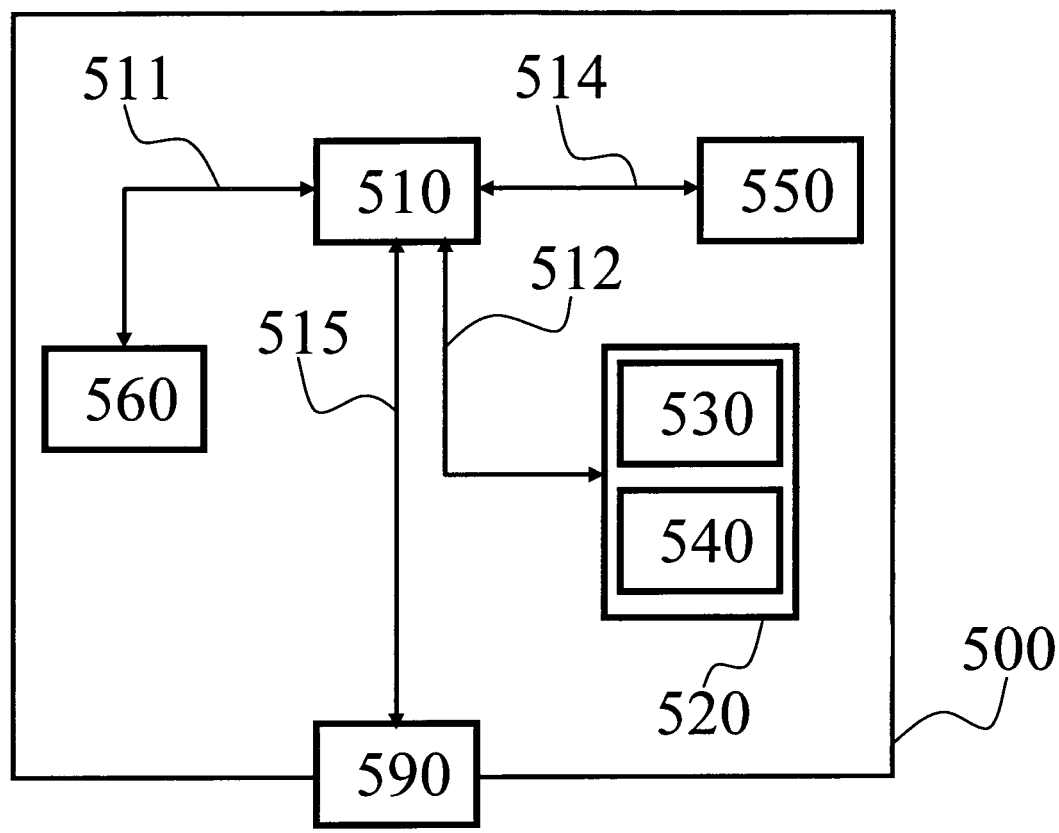
FIG. 3 shows the invention applied on a computer arrangement.

According to one embodiment of an aspect of the invention FIG. 3 shows an apparatus 500 according to one embodiment of an aspect of the invention, comprising a nonvolatile memory 520, a processor 510 and a read and write memory 560. The memory 520 has a first memory part 530, in which a computer program for controlling the apparatus 500 is stored. The computer program in the memory part 530 for controlling the apparatus 500 can be an operating system.

The apparatus 500 can be enclosed in, for example, a control unit, such as the control unit 45. The data-processing unit 510 can comprise, for example, a microcomputer.

The memory 520 also has a second memory part 540, in which a program for securing lubrication of an AMT in a vehicle according to an aspect of the invention is stored. In an alternative embodiment, the program for securing lubrication of an AMT in a vehicle is stored in a separate nonvolatile data storage medium 550, such as, for example, a CD or an exchangeable semiconductor memory. The program can be stored in an executable form or in a compressed state.

When it is stated below that the data-processing unit 510 runs a specific function, it should be clear that the data-processing unit 510 is running a specific part of the program stored in the memory 540 or a specific part of the program stored in the nonvolatile recording medium 550.

The data-processing unit 510 is tailored for communication with the memory 550 through a data bus 514. The data-processing unit 510 is also tailored for communication with the memory 520 through a data bus 512. In addition, the data-processing unit 510 is tailored for communication with the memory 560 through a data bus 511. The data-processing unit 510 is also tailored for communication with a data, port 590 by the use of a data bus 515.

The method according to an aspect of the present invention can be executed by the data-processing unit 510, by the data-processing unit 510 running the program stored in the memory 540 or the program stored in the nonvolatile recording medium 550.

The invention should not be deemed to be limited to the embodiments described above, but rather a number of further variants and modifications are conceivable within the scope of the following patent claims.

The invention claimed is:

1. Method for securing lubrication of an automated manual transmission in a vehicle, when towing the vehicle, and where a transmission lubrication system is drivingly connected to and driven by rotation of an intermediate shaft of the automated manual transmission, characterized by the following steps executed in mentioned order:
    registering a signal that towing of the vehicle is demanded,
    disengaging all gears that are arranged to drivingly engage or disengage an input shaft to the intermediate shaft of the automated manual transmission, and engaging one gear that is arranged to drivingly engage or disengage the intermediate shaft to an output shaft of the automated manual transmission.

2. Method as in claim 1, wherein the signal is manually initiated.

3. Method as in claim 1, wherein the signal is automatically initiated when a vehicle fault is registered that will make towing, of the vehicle necessary.

4. Method as in claim 1, wherein the signal is automatically initiated when vehicle velocity other than zero is registered and that a propulsion unit of the vehicle is turned off.

5. An automated manual transmission in a. vehicle comprising an input shaft, an intermediate shaft and an output shaft with several different gears arranged to drivingly engage or disengage the input shaft to the intermediate shaft, and to drivingly engage or disengage the intermediate shaft to the output shaft, and where a transmission lubrication system is drivingly connected to and driven by rotation of the intermediate shaft, wherein a control unit (45) is arranged to disengage all the gears drivingly connecting the input shaft and the intermediate shaft and to engage one of the gears arranged to drivingly connect the intermediate shaft and the output shaft, upon registration of a signal that towing of the vehicle is demanded and in order to drivingly connect the lubrication system with driven wheels of the vehicle.

6. An automated manual transmission as in claim 5 wherein the signal is initiated through a control for manually initiating the signal.

7. An automated manual transmission as in claim 5 further comprising an auxiliary gearing connected in series to the output shaft and where an auxiliary gearing output shaft is further connected to the driven wheels, wherein the control unit is arranged to engage a gear of the auxiliary gear in order to drivingly connect the output shaft with the auxiliary gearing output shaft, upon registration of a signal that towing of the vehicle is demanded and in order to drivingly connect the lubrication system with driven wheels of the vehicle.

8. A computer programmed with a program comprising a program code for executing the method as claimed in claim 1.

9. A computer program product comprising a program code, stored on a tangible computer-readable medium, for executing the method as claimed in claim 1.

10. A memory for a computer, the memory being loaded with a computer program product comprising a computer program for executing the method as claimed in claim 1.

* * * * *